United States Patent
Autret

(10) Patent No.: US 7,102,502 B2
(45) Date of Patent: Sep. 5, 2006

(54) METHOD FOR CONSTITUTING A HOME AUTOMATION NETWORK

(75) Inventor: Capucine Autret, Marnaz (FR)

(73) Assignee: Somfy SAS, Cluses (FR)

( * ) Notice: Subject to any disclaimer, the term of this patent is extended or adjusted under 35 U.S.C. 154(b) by 106 days.

(21) Appl. No.: 10/497,446

(22) PCT Filed: Nov. 27, 2002

(86) PCT No.: PCT/IB02/04973

§ 371 (c)(1),
(2), (4) Date: Jun. 1, 2004

(87) PCT Pub. No.: WO03/049375

PCT Pub. Date: Jun. 12, 2003

(65) Prior Publication Data

US 2004/0267909 A1    Dec. 30, 2004

(30) Foreign Application Priority Data

Dec. 5, 2001    (FR) .................................. 01 15880

(51) Int. Cl.
*G08B 26/00* (2006.01)
*G08B 15/00* (2006.01)

(52) U.S. Cl. ............ 340/505; 340/825.72; 340/825.52; 340/825.22; 700/1

(58) Field of Classification Search ................ 340/505
See application file for complete search history.

(56) References Cited

U.S. PATENT DOCUMENTS

| | | | |
|---|---|---|---|
| 4,385,296 A | 5/1983 | Tsubaki et al. | 340/825.72 |
| 4,689,786 A | 8/1987 | Sidhu et al. | 340/825.52 |
| 4,750,118 A | 6/1988 | Heitschel et al. | 340/825.69 |
| 4,847,834 A | 7/1989 | Bryant | 370/449 |
| 4,918,690 A | 4/1990 | Markkula, Jr. et al. | 340/825.52 |
| 4,988,992 A | 1/1991 | Heitschel et al. | 340/825.69 |
| 5,420,572 A | 5/1995 | Dolin, Jr. et al. | 340/825.5 |
| 5,544,037 A | 8/1996 | Luger | 340/825.52 |
| 5,844,888 A | 12/1998 | Markkula, Jr. et al. | 370/255 |
| 6,020,829 A | 2/2000 | Hormann | 340/825.69 |
| 6,191,701 B1 | 2/2001 | Bruwer | 340/825.69 |

FOREIGN PATENT DOCUMENTS

| | | |
|---|---|---|
| EP | 0533623 B1 | 3/1993 |
| EP | 0629934 | 12/1994 |
| EP | 0574636 B1 | 6/1996 |
| EP | 0838740 B1 | 1/2002 |
| FR | 2761183 | 9/1998 |
| WO | WO80/02711 | 12/1980 |

OTHER PUBLICATIONS

XP-001073055; Entitled: Bluetooth Wireless Technology In the Home; By R. Shephard; Communication Engineering Journal dated Oct. 2001; pp. 195-203.

*Primary Examiner*—Donnie L. Crosland
(74) *Attorney, Agent, or Firm*—Welsh & Katz

(57) ABSTRACT

A method of constituting a home automation network comprises bidirectional elements such as actuators (A1, A2, A3), at least unidirectional control elements (C1, C2, C3, S1) and bidirectional control elements (C60, C70, C800). It consists in lastingly functionally linking up at least two elements. The process is characterized in that the lasting functional linkup brings about at least one transfer from a bidirectional element to another bidirectional element of at least one information creating a hierarchical relationship between these two elements.

13 Claims, 1 Drawing Sheet

METHOD FOR CONSTITUTING A HOME AUTOMATION NETWORK

FIELD OF THE INVENTION

The invention relates to the field of home automation networks and more particularly to a method of constituting an individual network or a network comprising an association of individual networks, said network allowing communication between products intended for the management of security or comfort inside a building, and particularly in the home, when these products communicate via a non-wired link, and particularly by radio waves.

In the field of home automation or of the technical management of buildings, installations are already known that associate different components such as blinds, rolling shutters, gates and all other devices such as air conditioners or means of heating or lighting. Users, who are becoming increasingly demanding, have caused the technique of managing the different components to progress, and the manufacturers, in order to satisfy the clientele, have set up installations in home automation network form comprising management means.

The problems remaining to be solved are those due to the installation of the various components that are actuated by actuators, controlled by transmitters, sensors or all other control devices. In effect, the installer very frequently has to constitute the network without particular knowledge and must also ensure that new equipment elements are recognized and must constitute new groups of products in an existing installation, all in the simplest manner, without, for all that, knowing the sophisticated techniques of implementation.

BACKGROUND OF THE INVENTION

Already known are installations according to which the functional linkup allows two specific elements of the network to share, temporarily or permanently, a link of communication. This link allows, for example, a first element, to obey the instructions sent by a second element. The link here being called "temporary" when the link can be re-examined during an intentional reconfiguration of the network requiring an intervention by a person skilled in the art or by a knowledgeable user.

There are several manners, known to those skilled in the art, of sharing such a link.

For wired versions, developed through proprietary networks, and then shared, a configuration phase allows the installer to make the desired pairings and above all groupings. American patent U.S. Pat. No. 5,544,037 describes such a mode of defining group addresses in the lighting field. In the case of shared networks, of the Echelon (registered trademark) type, more intuitive methods of linkup are proposed. Such methods have been divulged notably by American patent U.S. Pat. No. 4,918,690 and European patents EP 0 838 740 and EP 0 574 636.

Through American patents U.S. Pat. No. 4,689,786 and U.S. Pat. No. 4,847,834 and through European patent EP 0 629 934, methods are known by which, to simplify the linkup, the physical identity of each network component usually gives way to a logical identity, for example, a serial number incremented each time a component is inserted into the local area network (LAN).

Concerning the linkup of systems communicating by radio waves, an additional difficulty arises because there is no wired link making it possible to distinguish clearly between what belongs to the network and what belongs to the outside, and this demands an increase in the level of security.

In the most simple cases as divulged by patents U.S. Pat. No. 4,385,296 and U.S. Pat. No. 4,750,118, a learning procedure allows the receiver of an element to place in memory an identification code contained in the transmitter of the other element, or vice versa.

Also described in the prior art are cloning methods, used to reproduce from one transmitter to the other a single code or a plurality of identification codes already known to one or more receivers. This reproduction may take place directly between said transmitters by means of a temporary wired link as in European patent EP 0 533 623 and American patent U.S. Pat. No. 6,020,829, or again directly between said transmitters by radio waves, one of the transmitters being in fact bidirectional as divulged in document U.S. Pat. No. 4,988,992.

The identification code may consist of a physical address or a logical address and may be encrypted during the learning transmission. The known methods of "rolling code" or of "code hopping" can be used to avoid directly transmitting the image of the identification code. In the best protected links, the identification code is itself totally variable and is simply a "seed" used by an algorithm of the receiver that allows the latter to predict the next value or values of the identification code. Only the seed is then transmitted during the learning procedure, as described in patent U.S. Pat. No. 6,191,701.

In the specifications of the Bluetooth (registered trademark) type network, the establishment of a link is achieved by the memorization of a common key, created and exchanged during a pairing procedure between two elements. As in the case of linkups of wired networks of the Echelon (registered trademark) type, the installer presses a specific button to designate each element intended to be tied up.

Further removed from networks, but sharing the authentication problem, the field of electronic locks has given rise to implementations in which the learning of a new control element (user-key) by an actuator element (lock) is performed under the supervision of a third element (master-key). This third element is not itself authenticated during a learning procedure but by a code pre-registered in the actuator element during its manufacture as described by the international patent application published under number WO 80/02711.

Also found, notably in French patent 2 761 183, in the field of remote door controls, is a form of authentication, during a functional linkup, performed by a transmitter which itself has been previously registered during a learning procedure. But this patent, filed by the applicant, does not provide for this step to be used to communicate, in bidirectional manner, the information necessary for the progressive implementation of a network.

Also known from patent U.S. Pat. No. 5,844,888 is a method of implementing a network comprising identical individual cells communicating with one another in bidirectional manner. Each cell receives an identifier during its manufacture. A cell grouping device is used to access the identifier specific to each cell and to group the cells by assigning a group identifier to them. When the network has been installed, the cells can group together themselves. This grouping is based on the sharing, between the cells, of a group identifier. The sending of identifiers is used to determine which cells are transmitters, which cells are receivers and which cells are transmission relays.

From patent U.S. Pat. No. 5,420,572, a device for configuring a communication network is known. This device comprises means allowing it to connect itself temporarily to the elements constituting the communication network in order to transfer information for use in constituting the latter.

All the prior art is therefore dedicated:

either to devices intended to function in univocal manner (several transmitters, one receiver) even in the case of possible bidirectional links (then simply intended for acknowledgement transmission by the receiver to the transmitters), or to devices communicating in a network and placed on a level of equality, without hierarchical structuring of said network, or to devices communicating in a network, in structured manner, after at least one phase of configuration in which the installer (or the competent user) has designated all the links and groups.

The prior art therefore does not resolve the problem of cohabitation in a home automation network of both unidirectional and bidirectional devices.

The prior art does not allow the setting up of a network installation according to modalities that are strictly identical (for the installer) to those used in the case of the univocal devices to which he is accustomed.

The prior art describes, in the patent of the applicant published under number 2 761 183, a type of functional linkup of two elements, carried out under the supervision of a third element, itself previously authenticated with one of the elements during a learning operation, but without these elements being bidirectional and furthermore without this linkup causing the transfer by a first bidirectional element to a second bidirectional element of at least one information structuring the network.

The prior art does not provide for:

the information hierarchically structuring the network to be a group name, the information hierarchically structuring the network to be the identity of the links already established with the first bidirectional element.

SUMMARY OF THE INVENTION

Thus, according to the invention, the method of constituting a home automation network, comprising bidirectional elements such as actuators, control elements which are at least unidirectional (transmitters, sensors), bidirectional control elements, is of the type which consists in lastingly functionally linking up at least two elements, and is characterized in that the lasting functional linkup brings about at least one transfer from a bidirectional element to another bidirectional element of at least one information creating a hierarchical relationship between these two elements.

According to an additional feature, the information creating a hierarchical relationship between these two elements comprises a group name.

According to another additional feature, the information creating a hierarchical relationship between these two elements comprises the identity of the links already established with the element sending the information.

Additionally, the method according to the invention can be such that the lasting functional linkup between two bidirectional elements is achieved under the supervision of a third element which is itself previously authenticated at one of the elements during a learning operation. This is particularly valuable when one of the bidirectional elements is difficult to access.

According to one of the embodiments, the functional linking up of a bidirectional control element with a bidirectional element is achieved under the supervision of an at least unidirectional control element.

According to other embodiments, the functional linking up of an at least unidirectional control element with a bidirectional element is performed under the supervision of a bidirectional control element, the functional linking up of two bidirectional control elements of the same hierarchical level is ensured by the linking up of each of the bidirectional control elements with a control element of higher hierarchical level, the functional linking up of two bidirectional elements is ensured by the successive functional linking up of each of them with one and the same bidirectional control element, during a functional linking up of a bidirectional control element with another element, the latter communicates to said bidirectional control element the set of identifiers relating to the elements with which it is already linked up, during a functional linking up between two control elements of different hierarchical levels, the transmission of information providing the preestablished relationships takes place from the lower level element to the higher level element, during a functional linking up of a bidirectional control element with another element, a group name is transferred that becomes common to all the lower level elements linked up with said bidirectional control element, the transmission of the group name can be coded according to an encryption algorithm: for example, the group name is not directly transmitted as such but in the form of a "seed" allowing the group name to be reconstructed by each element containing one and the same decryption polynomial.

The invention allows control or other unidirectional elements to cohabit in one and the same home automation network with bidirectional elements.

Amongst other things, it allows the network to be constituted progressively, in space and in time, while protecting this constitution, particularly against the intrusion of foreign elements and/or against the involuntary addressing of elements not belonging to the network.

In particular the invention makes it possible for no changes to be made to the way the installer does things, when he first and individually associates the simple control points with the actuators to be controlled, before proceeding to associate the general control point or points with said actuators, and allows a more direct method of pairing when the installer has a supervision set.

An important advantage of the invention is also that it permits the constitution of a network containing at least several elements on which no direct physical action of the installer is possible in order explicitly to designate the product or products to be linked up.

BRIEF DESCRIPTION OF THE DRAWING

The invention will be more easily understood through the description of a preferred embodiment, allowing the progressive and implicit constitution of the network.

Other features and advantages of the invention will emerge from the following description relating to the appended drawing.

DETAILED DESCRIPTION

Figure 1:
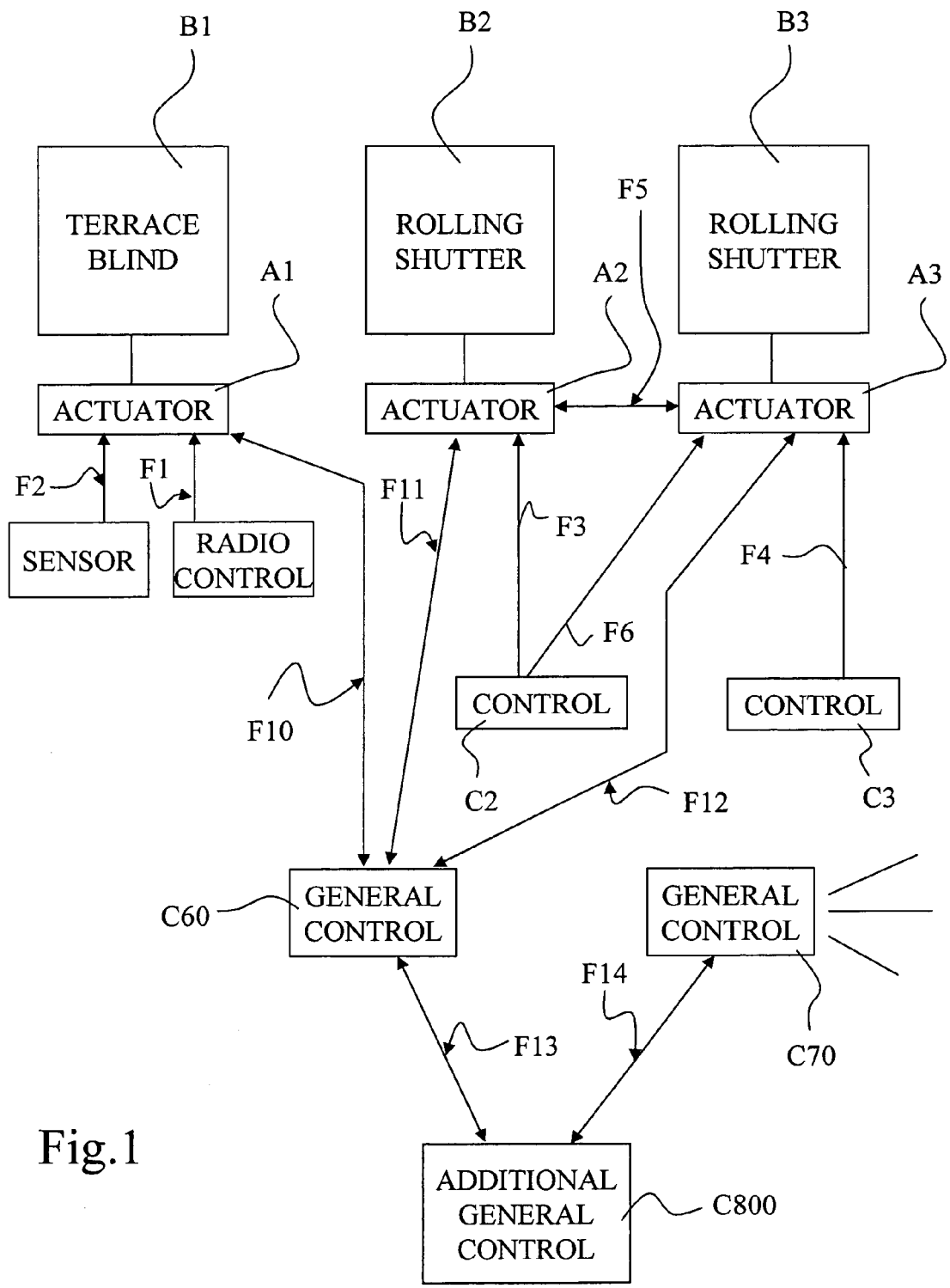
FIG. 1 is a diagram of a network to which the method according to the invention applies.

The communication network which is illustrated as an example in FIG. 1 comprises a partial or total combination of bidirectional elements associated with actuators and/or sensors, unidirectional elements associated with sensors, unidirectional elements associated with remote controls, bidirectional elements associated with remote controls to which a first hierarchical level is attributed and, finally, bidirectional elements associated with functions of remote control and of supervision with which a higher hierarchical level is associated. The hierarchical level of a bidirectional element is preferentially defined by the manufacturer and is mentioned in the communication frame.

Physical communication between elements of the network functions preferentially according to a multi-master/multi-slave mode.

FIG. 1 shows an example of a network comprising a set of actuators (A1, A2, A3), controls (C1, C3), a sensor (S1), placed in one and the same building. The actuators (A1, A2, A3) are radio controlled. They may themselves incorporate specific sensors, for example position, pressure or obstacle sensors. For simplification purposes, they are however designated by the single term "actuators". Placed inside the products they drive, the actuators are not directly accessible other than by a button or are quite simply difficult to access.

The installation of the products in FIG. 1 has been completed, for example, in several phases.

In a first installation phase, a terrace blind (B1) incorporating a first bidirectional actuator (A1) has been put in place, as has a first unidirectional wind-sun weather sensor (S1), intended for the automatic driving of the actuator (A1), which is provided also to be controlled directly by the user, by means of a first unidirectional radio control (C1).

The installer will first have to pair up the first radio control (C1) with the first actuator (A1) in a conventional manner, by using, for example, the so-called programming button disposed on the control, and a property of the actuators not yet paired (blank) to accept any pairing command, as described in the prior art. This first pairing is represented in FIG. 1 by the arrow (F1).

Thereafter, the first actuator (A1) does not accept any new pairing command unless it comes from a control that it already knows. For example, the pairing of the sensor (S1) with the first actuator (A1) will be performed by the installer under the supervision of the first control (C1). By pressing the programming button of the first control (C1), the installer uses this first control (C1) to transmit a learning request to the first actuator (A1), thus validating the acquisition by said first actuator (A1) of the next code transmitted. The installer then presses the programming control of the first sensor (S1). The identification of the first sensor (S1) is then registered by the first actuator (A1). This method is used to register several identifiers of the various controls in one and the same actuator. This second pairing is represented in FIG. 1 by the arrow (F2).

It will be noted that at this stage the bidirectional character of the first actuator (A1) is not yet used.

By pursuing the same example, the building experiences thereafter a second installation phase, with the putting in place of two rolling shutters (B2, B3) each incorporating an actuator (A2, A3), that is to say a second bidirectional actuator (A2), controlled by a first unidirectional control (C2) for the first rolling shutter (B2) and a third bidirectional actuator (A3) controlled by a third unidirectional control (C3) for the second rolling shutter (B3). The pairing of the second control (C2) with the second actuator (A2) and of the third control (C3) with the third actuator (A3) is performed as previously, by successive operations represented in FIG. 1 by the arrows (F3) and (F4).

At this stage, the bidirectional character of the second and third actuators (A2, A3) has as yet not been used.

However, another pairing procedure is possible for these two actuators (A2, A3), which use a previous communication method (represented by the arrow (F5)) between products not yet paired (blank).

This previous communication mode consists in that the newly connected blank products establish in standalone manner an order relationship by which they do not all react simultaneously to a command from the installer, and thus facilitating the individual pairing of the products. Such a method could just as well have been used here prior to the pairing of the second and third controls (C2, C3). The provisional bidirectional communication represented by the double arrow (F5) established on this occasion relates only to the blank products and could not be likened to the network construction described here, the aim of which is to establish lasting links between elements.

At this stage of the installation, it is, for example, decided for reasons of convenience, that the second control (C2) may also control the second rolling shutter normally activated by the third actuator (A3). The installer must therefore see to it that this third actuator (A3) learns to recognize the instructions of the second control (C2). This operation, represented by the arrow (F6) is performed under the supervision of the third control (C3), exactly as the first actuator (A1) learned to recognize the instructions of the first sensor (S1) under the supervision of the first control (C1).

Thereafter, it is decided to add to the installation a first general bidirectional control (C60), in order to constitute the network of the invention.

Exactly as he does it with the products of the prior art, the installer will necessarily have to see to it that the different actuators learn this new control. This takes the form of three successive pairing operations, represented in FIG. 1 by the arrows (F10, F11, F12). These operations are carried out respectively under the supervision of the first control (C1), of the second control (C2) and then the third control (C3).

According to the invention, this pairing step is used to transmit at least one of the following information:

the list of elements, already known to the actuators (A1, A2, A3), that is to say the controls (C1, C2, C3) and the sensor (S1).

a group name, which will be common to all the elements paired with this bidirectional control.

Advantageously, this group name originates, for example, from the identification number of the bidirectional control and, in this case, it will always be transmitted from that control to the elements with which that control is paired thereafter. It is nevertheless preferable in some cases for the group name, on the contrary, to originate from the first actuator (or element) paired with this bidirectional control. In this case, the group name will first of all be transmitted to the bidirectional control during the first pairing which, in turn, communicates it to the other elements during subsequent pairings.

This will be illustrated based on the installation in FIG. 1. During the linking up (F10) of the first actuator (A1) and of the first general control (C60), under the cover of the first control (C1), the first actuator (A1) transmits to said first general control (C60) the identifiers that it knows, that is to say the first control (C1) and the sensor (S1). Likewise, during the linking up (F11) between the second actuator (A2) and said first general control (C60), under cover of the second control (C2), the second actuator (A2) transmits to the first general control (C60) the identifier that it knows, that is to say the second control (C2), and finally, during the linking up (F12) of the third actuator (A3) with the first general control (C60), under cover of the third control (C3), the third actuator (A3) transmits to the first general control (C60) the identifiers of the second and third controls (C2, C3).

Clearly these operations are carried out in any order.

It is proposed to profit from this first linkup to transfer simultaneously and automatically a common identifier serving as group name to the network now constituted, implicitly, by these successive linkups. The group name (NG1) is advantageously constructed based on the identifier of the first general control (C60). All the actuators, that is to say the first, the second and the third actuators (A1, A2, A3), then know that they are part of the same group (NG1).

This has the effect of:

allowing the relaying (repetition, routing) where appropriate by any bidirectional actuator (A1, A2, A3) of the network NG of any message sensed by one of the actuators that is not the intended recipient of said message and for which it establishes that the intended recipient has not sent an acknowledgement. This process known elsewhere, giving the network significant "robustness", allows:

operation in low activity/low consumption mode of all the actuators, the latter pursuing each frame sensing only if the latter has begun with the network identifier, reaction to a collective polling mode concerning the members of the network only.

As such, it is entirely possible to use the invention in a different chronology from that which has just been proposed. Thus, during each of the first linkups (F10, F11, F12), only the group name NG1 is transmitted. It would then be only during a succession of subsequent individual polls, or better during a collective poll, carried out by the first general control (C60), that the identifiers known to each actuator (A1, A2, A3) would be transmitted to this control (C60).

After this operation, the first general control (C60) therefore has a table, preferentially structured, giving the topology of the group (NG1), as follows:

NG1 - C60
  A1
    C1
    S1
  A2
    C2
  A3
    C3
    C2

The value of ensuring that the identifiers known to each actuator (or more generally to each bidirectional element) automatically uploaded to the general control (C60) can be easily understood from a single example: it is known that rolling shutters can very effectively contribute to light management or to protecting the interior against overheating from the sun. Thus, the information given by the sensor (S1) initially attached functionally to the single first actuator (A1) becomes available for the general control (C60) and usable if the latter contains a solar management program, or even directly for all the equipment elements in the group (NG1) which activate such a program previously registered or downloaded after installation.

In parallel with the previous installation, concerning the mobile products of the building, one can imagine having to install other radio controlled products using one and the same protocol, shared between several specialisms. It would involve, for example, lighting systems (B4) or heating and air conditioning systems (B5), not shown, fitted with actuators, respectively, a fourth actuator (A4) and a fifth actuator (A5), controlled respectively by a fourth control (C4) and a fifth control (C5), and even a second sensor (S2), these also not being shown.

These other systems are in turn controlled by at least one second general bidirectional control (C70). These systems constitute another independent network (NG2). The table in the second general control (C70) contains, as previously, the (structured) list of all the identifiers of the group NG2. Suppose, for example, that the second general control (C70) contains the identifiers of the two actuators, that is to say of the fourth actuator (A4) and of the fifth actuator (A5) in turn controlled by their corresponding controls (C4) and (C5), and also by the second sensor (S2).

In a new installation phase, an additional bidirectional control (C800) of a higher hierarchical level than the first and second general controls, respectively (C60, C70), is installed. This additional general control is, for example, a centralized control furnished with comfort management programs requiring the interaction of products of different specialisms.

Note that, this time, a direct pairing of the additional general control (C800) with the first general control (C60) or with the second general control (C70) is possible, since this type of product can be accessed directly by the installer and possesses, for example, a learning designation or initiation button. The pairing therefore is no longer necessarily done under the supervision of a third, previously authenticated, component.

On the other hand, each of these pairing operations will take place, according to the invention, on an information transfer.

For example, the additional control (C800) transmits its group name (NG3) to the first general control (C60), while this general control (C60) transmits its group name (NG1) to the additional control (C800). Likewise, the group names (NG2 and NG3) are exchanged between the additional control (C800) and the second general control (C70).

During the same operation, or in deferred manner, the identifiers included in each table are also transmitted.

Thus, the table included in the additional control (C800) may appear structured as follows:

NG3 - C800:
  NG1 - C60
    A1
      C1
      S1
    A2
      C2
    A3
      C3
      C2
  NG2 - C70
    A4
      C4
    A5
      C5
      S2

The first general control (C60) and the second general control (C70) now know that they belong to one and the same set (NG3) and may, where appropriate, propagate this information to the elements they supervise.

It can be seen that, although communication between elements of the network may take place in any manner and, for example, in multi-master/multi-slave form, the network is functionally structured by the very way in which it is constituted.

It has been understood that lasting functional linkup meant that, until there is a new intervention in the installation, a first element becomes capable of sending orders or information to a second element capable of receiving, interpreting or executing them.

Additionally, several complementary or mutually exclusive embodiments can be used:

1. The functional linking up of a bidirectional control (C60) with a bidirectional actuator (A1, A2, A3) is performed under the supervision of a unidirectional control element (C1, C2, C3).

2. The functional linking up of an at least unidirectional control element (C1, C2, C3) or of an at least unidirectional sensor (S1) with a bidirectional sensor-actuator element (A1, A2, A3) is performed under the supervision of a bidirectional control (C60).

3. The functional linking up of two bidirectional controls (C60, C70) of the same hierarchical level is ensured by the linking up of each of the bidirectional controls with a control of higher hierarchical level (C800).

4. The functional linking up of two bidirectional sensor-actuators (A1, A2, A3) is ensured by the successive linking up of each of them with one and the same bidirectional control (C60).

5. During a functional linking up of a bidirectional control (C60, C70 or C800) with one of the elements, the latter communicates to said bidirectional control the set of identifiers relating to the controls with which it is already linked up.

6. In the case of a linking up between two controls of different hierarchical level, the transmission of information on the preestablished relations takes place from the lower level element to the higher level element.

7. During a functional linking up of a bidirectional control (C60, C70 or C800) with one of the elements, a group name NG is transferred that is common to all the lower level elements linked up with said bidirectional control unit.

8. The transmission of the group name NG is coded according to an encryption algorithm. For example, the group name is not directly transmitted as such but in the form of a "seed" allowing the group name to be reconstituted by each element containing one and the same decryption polynomial.

It has been seen, in the network given as an example, that the first, the second and the third control (C1, C2, C3) are unidirectional elements, but this does not have to be the case, because the one or the other, or even the totality of the controls, may be of the bidirectional type, if only for transferring an acknowledgement, for example.

The description does not mention the subsequent update procedures, during a pairing of new elements in the network that is already constituted, these procedures being within the capabilities of those skilled in the art.

Naturally, the invention is not restricted to the embodiments described and represented as examples, but it also includes all the technical equivalents and their combinations.

The invention claimed is:

1. A method of constituting a home automation network, comprising bidirectional elements such as actuators, control elements which are at least unidirectional, bidirectional control elements, which include in lastingly functionally linking up at least two elements, wherein said lastingly functionally linking up of said at least two elements brings about at least one transfer from a bidirectional element to another bidirectional element of at least one information creating a hierarchical relationship between said two elements.

2. The method of constituting a home automation network, as claimed in claim 1, wherein the information creating a hierarchical relationship between said two elements includes a group name.

3. The method of constituting a home automation network, as claimed in claim 2, wherein a transmission of the group name is coded according to an encryption algorithm.

4. The method of constituting a home automation network, as claimed in claim 1, wherein the information creating a hierarchical relationship between said two elements comprises an identity of the links already established with the element sending the information.

5. The method of constituting a home automation network, as claimed in claim 1, wherein the lasting functional linkup between two bidirectional elements is achieved under the supervision of a third element which is itself previously authenticated at one of the elements during a learning operation.

6. The method of constituting a home automation network, as claimed in claim 1, wherein the functional linking up of a bidirectional control element with a bidirectional element is performed under the supervision of an at least unidirectional control element.

7. The method of constituting a home automation network, as claimed in claim 1, wherein the functional linking up of an at least unidirectional control element with a bidirectional element is performed under the supervision of a bidirectional control element.

8. The method of constituting a home automation network, as claimed in claim 1, wherein the functional linking up of two bidirectional control elements of the same hierarchical level is ensured by the linking up of each of the bidirectional control elements with a control element of higher hierarchical level.

9. The method of constituting a home automation network, as claimed in claim 1, wherein the functional linking up of two bidirectional elements is ensured by the successive functional linking up of each of the bidirectional elements with one and the same bidirectional control element.

10. The method of constituting a home automation network, as claimed in claim 1, wherein, during a functional linking up of a bidirectional control element with another element, said another element communicates to said bidirectional control element a set of identifiers relating to the elements with which it is already linked up.

11. The method of constituting a home automation network, as claimed in claim 1, wherein, during a functional linking up between two control elements of different hierarchical level, the transmission of information regarding preestablished relationships takes place from an element of a lower level to an element of a higher level.

12. The method of constituting a home automation network, as claimed claim 2, wherein, during a functional linking up of a bidirectional control element with another element, there is exchanged a group name becoming common to all the elements of lower level linked up with said bidirectional control element.

13. The method of constituting a home automation network, as claimed in claim 12, wherein in that the transmission of a group name is coded according to an encryption algorithm.

* * * * *